United States Patent [19]

Brand

[11] Patent Number: 4,579,301

[45] Date of Patent: Apr. 1, 1986

[54] PILOT MODULE

[76] Inventor: Rolf Brand, 212 N. Mecklenburg, South Hill, Va. 23970

[21] Appl. No.: 587,158

[22] Filed: Mar. 7, 1984

[51] Int. Cl.$^4$ ............................................... B64C 1/00
[52] U.S. Cl. .................................. 244/119; 244/117 R
[58] Field of Search ................... 244/DIG. 1, 16, 13, 244/119, 120, 67; 296/188, 31 P, 66, 187, 188, 30

[56] References Cited

U.S. PATENT DOCUMENTS

| | | | |
|---|---|---|---|
| 2,876,037 | 3/1959 | Ingolia et al. | 244/119 |
| 3,048,355 | 8/1962 | Dornier, Jr. | 244/119 |
| 3,490,983 | 1/1970 | Lee | 244/119 |
| 3,632,156 | 1/1972 | Schweser | 296/31 P |
| 4,121,791 | 10/1978 | Taylor et al. | 244/120 |

FOREIGN PATENT DOCUMENTS 452058  2/1914  France ..................... 244/DIG. 1.4

OTHER PUBLICATIONS

*Ultralights*, "The Right Version", American Ultralights Falcon, vol. 2, No. 4, May 1984, p. 55.

*Primary Examiner*—Trygve M. Blix
*Assistant Examiner*—Rodney Corl
*Attorney, Agent, or Firm*—Lalos, Keegan & Kaye

[57] ABSTRACT

A pilot module for a lightweight aircraft having a fuselage primary structure that includes a longitudinally disposed support structure, or boom and also having a wing structure attached to the fuselage primary structure, a tail structure attached aft of the wing structure to the fuselage primary structure, and a propeller assembly attached to the fuselage primary structure. The pilot module includes a pilot support shell constructed of a composite material formed to support the seat, legs, and back of a pilot positioned on it and forming an integral part of the fuselage primary structure. The pilot support shell is positioned at least partially forward of the forward end of the boom. At least one reinforcing member is connected to the pilot support shell and to the boom and is constructed in a single piece with the support shell. The reinforcing member also forms an integral part of the fuselage primary structure. An external fairing is positioned behind and attached to the pilot support shell.

41 Claims, 14 Drawing Figures

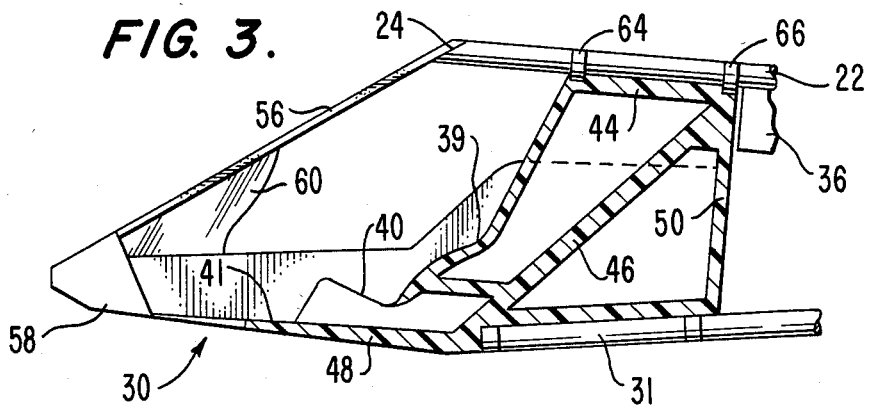
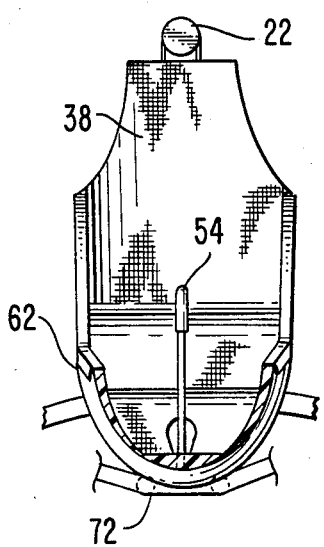
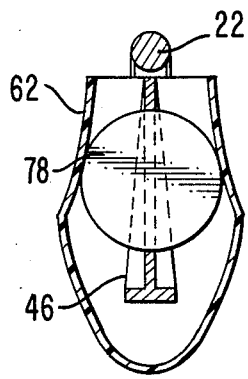
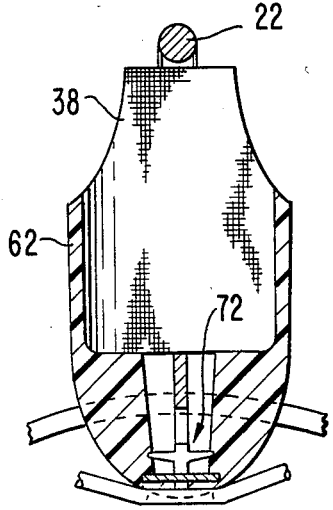
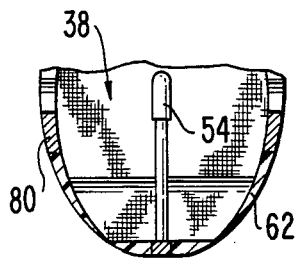
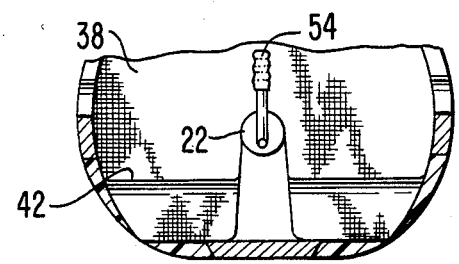
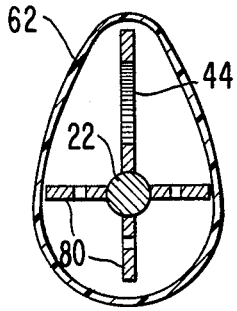

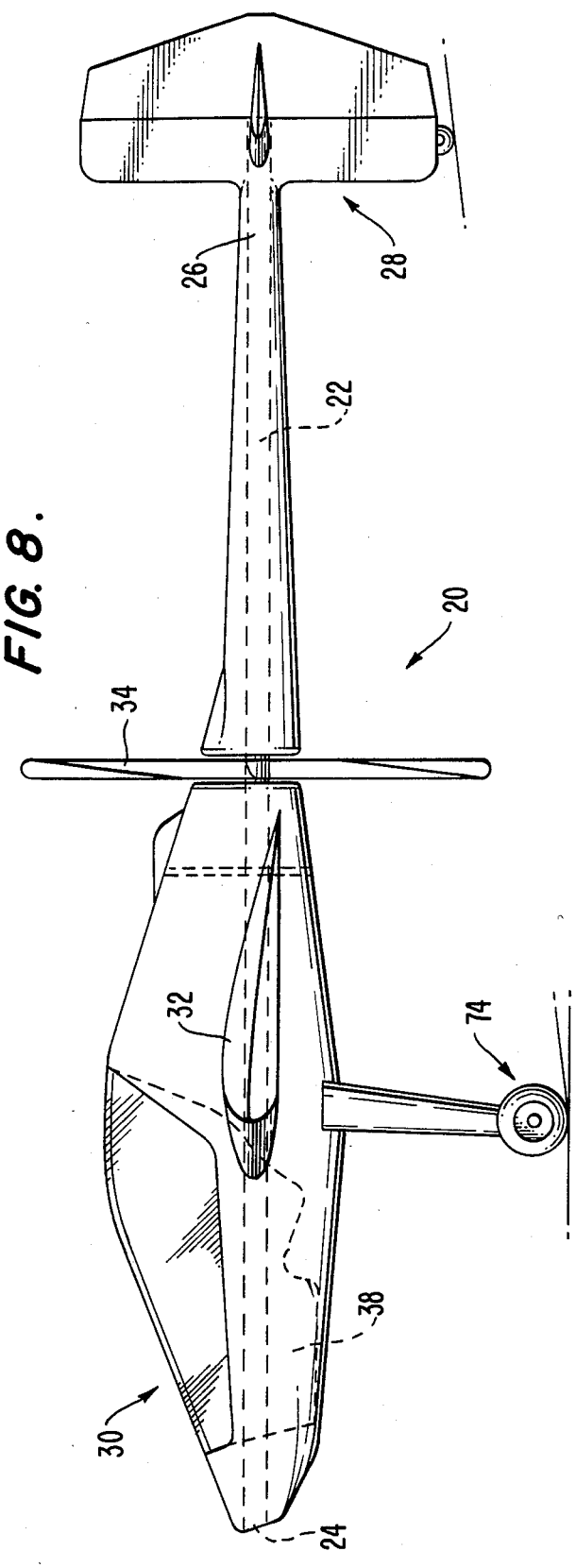
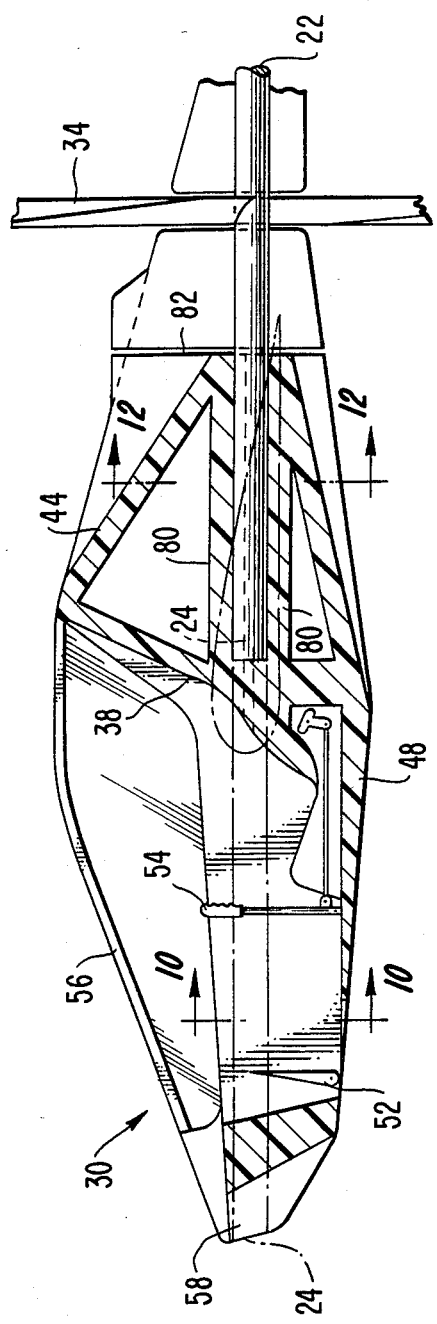

PILOT MODULE

BACKGROUND OF THE INVENTION

This invention relates to aircraft including ultralightweight and lightweight aircrafts. It relates further to the pilot module or occupant housing for such aircraft.

Various designs for positioning and securing an occupant's seating assembly in an aircraft are known in the prior art. For example, in the past the cabin interior seats have been attached to the fuselage frame and a fabric then covers the fuselage. Another example typically found in the present day metal skin and composite structure aircraft uses a stressed metal skin structure having some frame backing. However, the seats and interior components are attached to a backup form or an external fairing. These prior aircraft require additional structure to transfer forces from the occupant's seating arrangement to the plane's frame and the external primary aircraft structure. Further, especially for lightweight or ultralightweight aircraft, in which weight is important and users thereof enjoy the exhilaration of exposure to the wind and elements, no seating arrangement has been developed which adequately protects the occupants from serious injury when the aircraft impacts a structure, another aircraft, the ground, trees, or any other objects.

OBJECTS OF THE INVENTION

Accordingly, it is the principal object of the present invention to provide a novel aircraft pilot module.

Another object of the present invention is to provide an improved aircraft occupant housing that betters absorbs the general structural forces imposed on it.

A further object of the present invention is to provide a seating arrangement that more comfortably and safely supports the occupants.

A still further object of the present invention is to provide a novel seating arrangement for lightweight aircraft that has greater strength and less weight than previously available.

Another object is to provide an improved aircraft occupant enclosure that lessens primary and secondary injury in case of impact of the aircraft.

A further object is to provide an aircraft occupant enclosure system that is cheaper to manufacture.

A still further object is to provide an improved seating arrangement that provides for easy access to the rudder pedals and to the control stick.

Another object is to provide a novel seating arrangement which can be employed in a variety of kinds of aircraft including lightweight and ultralightweight aircraft.

A further object is to provide a seating enclosure which better distributes the external loads imposed on the fuselage primary structure by the secondary aircraft structures.

A still further object is to provide a novel lightweight aircraft pilot seating assembly which better resists disintergration on impact.

Other objects and advantages of the present invention will become more apparent to those persons having ordinary skill in the art to which the present invention pertains from the foregoing description taken in conjunction with the accompanying drawings.

THE DRAWINGS

FIG. 3 is a view similar to FIG. 2 illustrating a second embodiment of the present invention.

FIG. 5 is a cross-sectional view taken along line 5—5 in FIG. 2.

FIG. 6 is a cross-sectional view taken along line 6—6 in FIG. 2.

FIG. 7 is a cross-sectional view taken along line 7—7 in FIG. 2.

FIG. 8 is a side elevational view similar to FIG. 1 illustrating a third embodiment of the present invention.

FIG. 9 is an enlarged cross-sectional view of a modification of the pilot module of the aircraft of FIG. 8.

FIG. 10 is a cross-sectional view taken along line 10—10 in FIG. 9.

FIG. 11 is a view similar to FIG. 10 illustrating the embodiment of FIG. 8.

FIG. 12 is a cross-sectional view taken along line 12—12 of FIG. 9.

DESCRIPTION OF THE INVENTION

Figure 1:
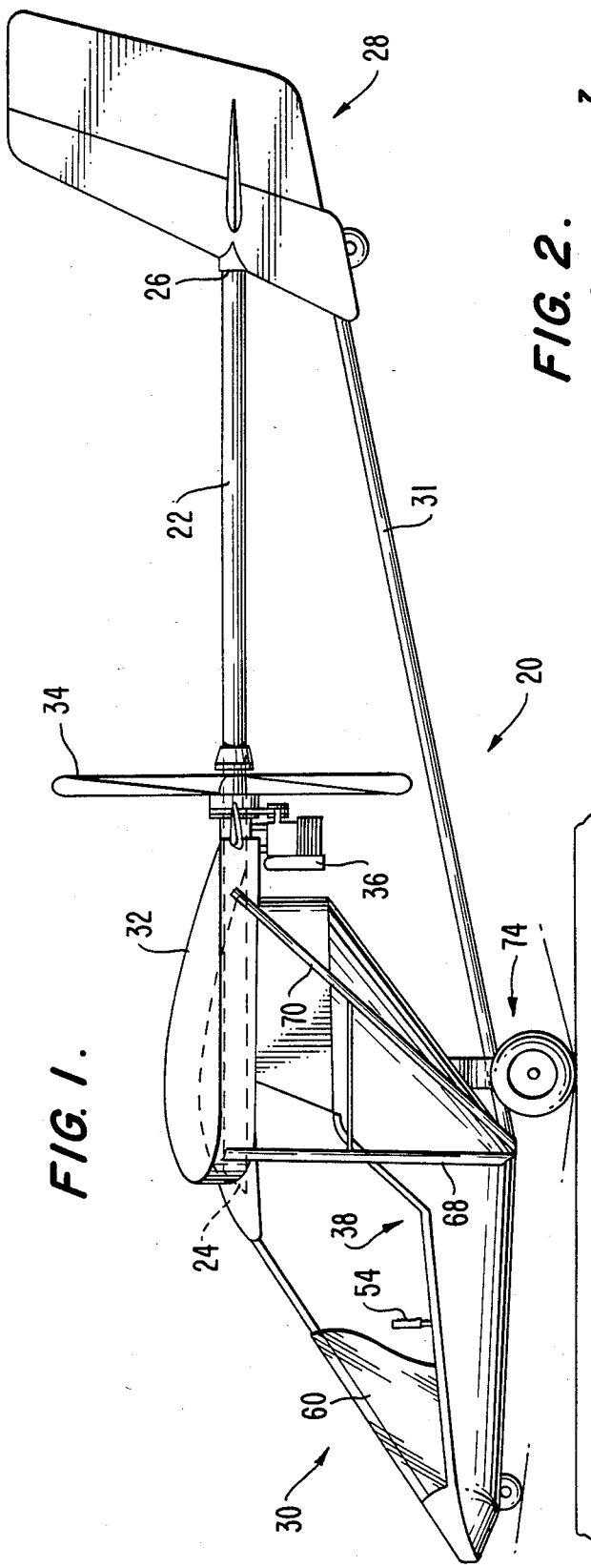
FIG. 1 is a side elevational view of an aircraft embodying the present invention.

Referring to FIG. 1 there is illustrated a lightweight aircraft shown generally at 20 embodying the present invention. It is seen that aircraft 20 includes a main longitudinal structural boom 22 having a forward end 24 and an aft end 26. A tail structure shown generally at 28 is attached to aft end 26, and a pilot module shown generally at 30 is attached to the forward end and in the FIG. 1 embodiment strut 31 interconnects the lower end of pilot module 30 and tail structure 28. The wing structure 32 for the aircraft is supported generally at the forward end 24 of boom 22, and the propeller 34 is disposed behind wing structure 32 and pilot module 30 and forward of tail structure 28. Propeller 34 is mounted for concentric rotation about the boom as best described in U.S. Pat. No. 4,382,566, the contents of which are hereby incorporated by reference in their entirety. The engine 36 is similarly mounted forward of the propeller and is drivingly connected to propeller 34 as described, for example, in the aforementioned patent.

Figure 2:
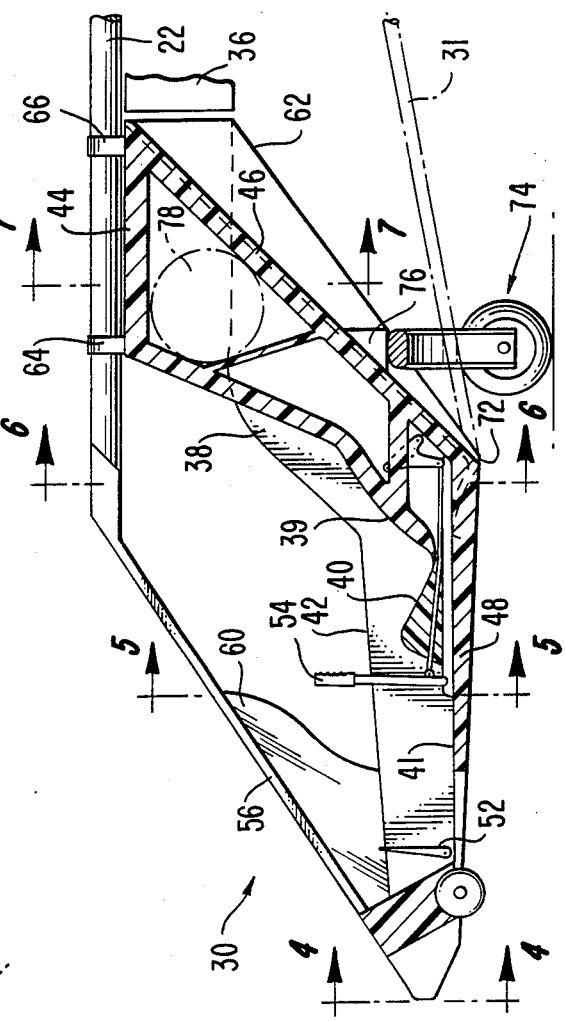
FIG. 2 is an enlarged cross-sectional view of the pilot module of the aircraft of FIG. 1.
Figure 4:
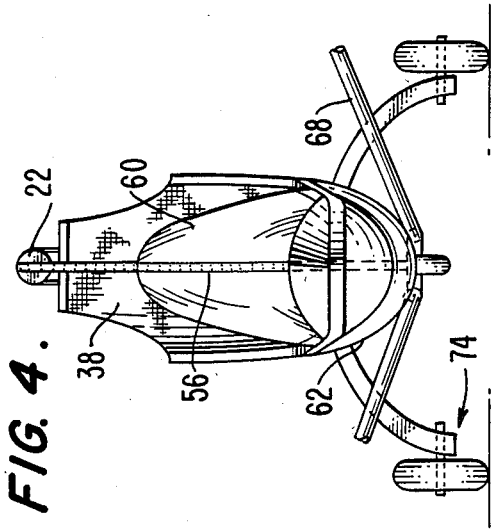
FIG. 4 is a cross-sectional view taken along line 4—4 in FIG. 2.
Figure 13:
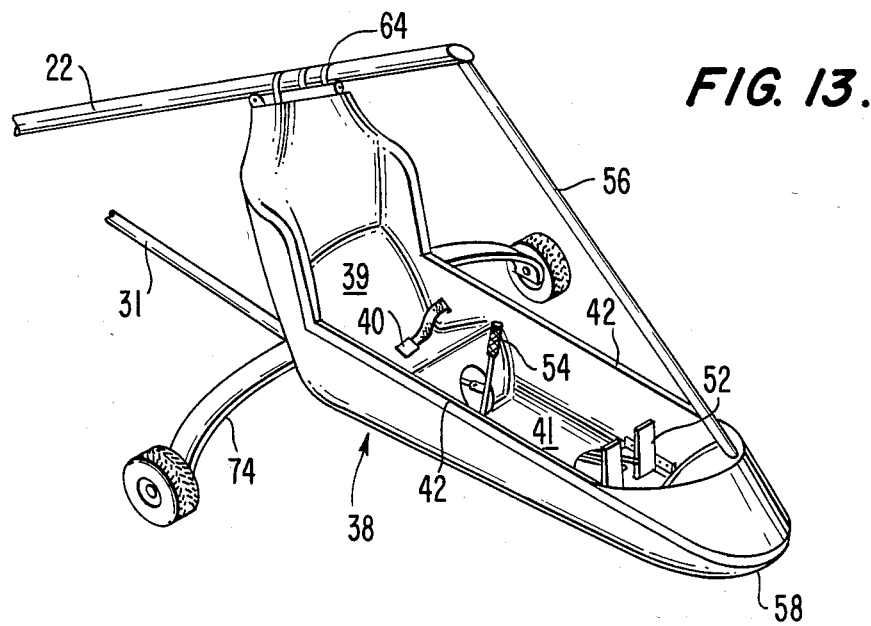
FIG. 13 is a perspective view of the forward portion of the aircraft of FIG. 1 illustrating the pilot module.
Figure 14:
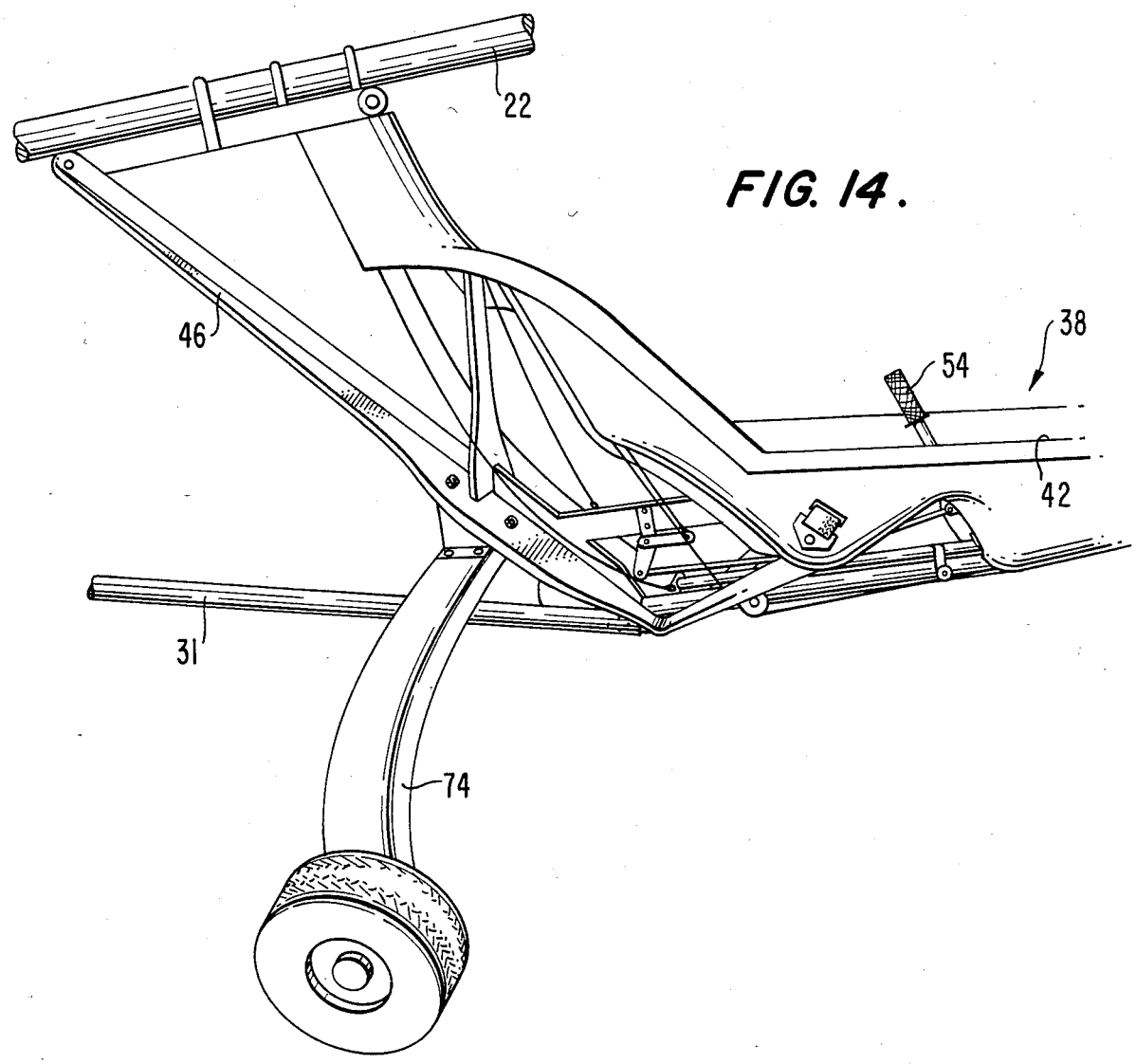
FIG. 14 is an enlarged side elevational view of a portion of the pilot module of FIG. 13.

Pilot module 30 includes a pilot support shell best shown at 38 in FIG. 2. Support shell 38 is curved and shaped to fully and comfortably support the pilot's back as by back support 39, the pilot's seat as by seat 40, the feet as by floor 41, and the arms as by arm rest side rails 42, and the pilot when seated will be in a reclined position as can be best pictured from FIG. 13. Support shell 38 is formed of a composite structure consisting of glass, kevlar, and carbon or other high strength randomly-dispersed fibers embedded in a suitable matrix of polyester or epoxy resins. The strength of the support shell can be varied in its different areas according to the need for accommodating the various differing stresses imposed on it and this can be done by varying the number of layers and orientations of the fibers. Also, fibers especially resistant to tearing can form part of the composite structure thereby providing a very high strength to weight ratio and also an increased resistance to disintegration. This resistance to disintegration reduces the risk of secondary injury to the occupants of the pilot module in case of impact. Further, concentrations of embedded metal can be placed within the composite structure at the attachment points of the various secondary attached structures to help better distribute the loads imposed on the support shell by the secondary attached structures.

Reinforcing members 44, 46, 48 and 50, are best illustrated in FIGS. 2 and 3, provide additional strength to support shell 38, and also strengthen the attachment of the boom to the shell. Further, the reinforcing members provide additional attachment and support surfaces to which secondary structures of the aircraft can be attached. The reinforcing members can be attached to the support shell at the time the shell is constructed in a one step working process. In this process, the shell is formed over a female mold at which time the reinforcing members made of the same composite material are attached to the shell.

Support shell 38, reinforcing members 44, 46, 48 and 50, and boom 22 form the fuselage primary structure of the lightweight aircraft 20. This design eliminates the old structures previously required to transfer forces from the aircraft occupants' housing to the frame or to the external primary structure of the aircraft. Thus, the support shell acts in concert with the reinforcing members to absorb the general structural forces imposed on it and to provide a progressive resistance to impact to prevent primary as well as secondary injury to the occupants seated in the shell. The compound curves and shapes of the support shell as shown in the drawings allow for progressive impact resistance of the fuselage primary structure thereby lessening the deacceleration forces in case of impact. It is seen that the present design provides the greatest strength to the part of the fuselage which is the immediate environment of the occupants and thus provides the greatest safety to the occupants.

The rudder pedal assembly 52 is directly mounted to support shell 38, as best shown in FIGS. 2 and 9, and appropriate connections are provided from the assembly to the rudders. Similarly, the control stick 54, as illustrated in FIGS. 2, 6, and 9–11, is connected to the support shell 38 convenient to a pilot seated therein. A protective bar 56 extends between the middle of the nose portion 58 of support shell 38 and boom forward end 24. In addition to protecting a pilot seated in the support shell, protective bar 56 further reinforces the structural continuity and integrity of the fuselage primary structure. As shown in FIGS. 1 and 2, a partial windshield 60 can be mounted at the forward end of support shell 38 to nose portion 58 and to protective bar 56. Also attached to support shell 38 is the external fairing 62, which is a secondary form-giving structure of the aircraft.

As best shown in FIGS. 4, 6, 7, 10, and 11, pilot support shell 38 has a U-shaped structural cross-section. The U-shape is defined by a lower horizontal flange, a pair of vertical web members connected to the flange, and a pair of upper flanges connected to the upper ends of the vertical web members. Seat 40 stiffens and transfers loads directly to the webs. Floor 41 and back support 39 act directly as the lower flange and arm rest side rails 42 as the upper flanges. Thus, it is seen that the seat, floor, and back support define a continuous structure and all are essential to the structural integrity of support shell 38. Additionally, unlike many prior aircraft, if external fairing 62 were omitted the structural strength of support shell 38 would not be effected.

As illustrated in FIGS. 1 and 2, the booms supporting the wing structure 32 are mounted to the reinforcing members by wing boom fittings 64 and 66, respectively. The wing struts 68 and 70, as best shown in FIG. 1, are similarly mounted directly to the reinforcing members by wing strut fittings 72. Also, the landing gear shown generally at 74 is secured directly to the reinforcing members by landing gear fitting 76 illustrated in FIGS. 1 and 2.

Engine 36 which rotates propeller 34 is attached directly to boom 22 in the embodiment of FIG. 1, and the fuel tank 78 for the engine is mounted behind the support shell and to the reinforcing members. However, in the embodiment of FIG. 3, engine 36 is directly attached to the reinforcing members, and not the boom. Further the embodiments of the subject lightweight aircraft illustrated in FIGS. 1 and 3 show the use of the present invention for a high-wing aircraft wherein wing structure 32 is mounted above boom 22. On the other hand, the embodiment of FIG. 8 (and FIG. 11) illustrates the use of the present invention for a mid-wing aircraft wherein the wing structure 32 is in the generally same horizontal plane as the boom. The embodiment of FIGS. 8 and 9 illustrates the positioning of the boom forward end 24 such that it ends directly behind the support shell. This design, however, requires a special reinforcement 80 to transfer the forces away from the support shell in case of impact. It is also within the scope of the present invention to provide a firewall 82, best shown in FIG. 9, positioned between the propeller and engine and the support shell. In the modification shown in FIG. 11, fuselage boom 22 extends to the forward end of the aircraft and thereby directly transfers the impact forces from the engine, tail and wing structures to the fuselage primary structure and to the support shell which resists the forces exerted on its occupants and holds them restrained by suitable lap and shoulder harnesses within their support shell seat.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:
1. A lightweight aircraft comprising:
  a main longitudinal support structure having a forward end,
  a pilot support shell constructed of composite material formed to support the seat, legs, and back of a pilot seated in it, said main longitudinal support structure being securely mounted to said pilot support shell,
  a reinforcing means for reinforcing the connection between said main longitudinal support structure and said pilot support shell,
  said reinforcing means being formed of said composite material in a single piece with said pilot support shell,
  said main longitudinal support structure, said pilot support shell, and said reinforcing means forming the fuselage primary structure of said lightweight aircraft, a wing structure attached to said fuselage primary structure, a tail structure attached to said fuselage primary structure behind said wing structure, and a propelling means attached to said fuselage primary structure.

2. The lightweight aircraft of claim 1 including,
at least a portion of said pilot support shell being forward of said forward end.

3. The lightweight aircraft of claim 1 including,
a landing gear assembly attached to said fuselage primary structure, and
a landing gear fitting connected to said landing gear assembly and directly attached to said reinforcing means.

4. The lightweight aircraft of claim 1 including,
said propelling means including an engine mounted to said fuselage primary structure.

5. The lightweight aircraft of claim 4 including,
said engine being mounted directly to said main longitudinal support structure.

6. The lightweight aircraft of claim 4 including,
said engine being mounted directly to said reinforcing means.

7. The lightweight aircraft of claim 1 including,
an external fairing structure attached to said fuselage primary structure and positioned aft of said pilot support shell.

8. The lightweight aircraft of claim 7 including,
said external fairing structure being directly attached to said pilot support shell.

9. The lightweight aircraft of claim 1 including,
said composite material comprising a mixture of high strength fibers embedded in a resin matrix.

10. The lightweight aircraft of claim 9 including,
said mixture of high strength fibers comprising glass, kevlar, and carbon fibers.

11. The lightweight aircraft of claim 9 including,
said resin matrix comprising polyester resins.

12. The lightweight aircraft of claim 9 including,
said resin matrix comprising epoxy resins.

13. The lightweight aircraft of claim 1 including,
a rudder pedal assembly directly attached to said pilot support shell, and
a control stick assembly directly attached to said pilot support shell.

14. The lightweight aircraft of claim 1 including,
a wing boom fitting assembly connected to said wing structure and directly attached to said reinforcing means.

15. The lightweight aircraft of claim 1 including,
said reinforcing means being directly mounted to said main longitudinal support structure.

16. The lightweight aircraft of claim 1 including,
said propelling means including a fuel tank directly mounted to said reinforcing means.

17. The lightweight aircraft of claim 1 including, said main longitudinal support structure comprising a boom, and
said wing structure being mounted above said boom.

18. The lightweight aircraft of claim 1 including,
said main longitudinal support structure comprising a boom, and
said wing structure being mounted in generally the same horizontal plane as said boom.

19. The lightweight aircraft of claim 1 including,
said forward end being positioned directly behind said pilot support shell.

20. The lightweight aircraft of claim 1 including,
at least one secondary structure mounted to said fuselage primary structure to at least one attachment point,
said reinforcing means being formed of said composite material in a single piece with said pilot support shell, and
said composite material including embedded metal portions at said attachment point.

21. The lightweight aircraft of claim 1 including,
said composite material being comprised of layers of fibers that are resistant to tearing.

22. A lightweight aircraft comprising:
a main longitudinal support structure,
a pilot support shell securely mounted to said main longitudinal support structure,
said pilot support shell including a pilot structure formed to support the seat, legs, and back of a pilot seated thereon and a pilot enclosure structure formed to generally enclose a pilot seated on said pilot support structure,
said pilot support structure and said pilot enclosure structure being formed of generally the same material in a single piece,
a reinforcing means for reinforcing the connection between said main longitudianl support structure and said pilot support shell,
said main longitudinal support structure, said support shell, and said reinforcing means forming the fuselage primary structure of said lightweight aircraft,
a wing structure attached to said fuselage primary structure,
a tail structure attached to said fuselage primary structure behind said wing structure, and
a propelling means attached to said fuselage primary structure.

23. The lightweight aircraft of claim 22 including,
said material being a composite material comprising a mixture of high strength fibers embedded in a resin matrix.

24. The lightweight aircraft of claim 22 including,
said main longitudinal support structure having a longitudinal axis, and
said longitudinal axis passing generally through the middle of said pilot support shell.

25. The lightweight aircraft of claim 22 including,
at least a portion of said pilot support shell being disposed forward of the forward end of said main longitudianl support structure.

26. The lightweight aircraft of claim 22 including,
said pilot support structure including an arm rest formed of said material in a single piece with said pilot enclosure structure.

27. The lightweight aircraft of claim 22 including,
a rudder pedal assembly directly mounted to said pilot support shell, and
a control stick assembly directly mounted to said pilot support shell.

28. The lightweight aircraft of claim 22 including,
said main longitudinal support structure having its forward end being positioned directly behind said pilot support shell.

29. The lightweight aircraft of claim 22 including,
said material comprising a composite material that provides all of the strength and stiffness to support the seat back and legs of a pilot seated on said pilot support structure.

30. A lightweight aircraft comprising:

a main longitudinal support structure having a forward end, a pilot support shell constructed of composite material formed to support the seat, legs, and back of a pilot seated in it, said main longitudinal support structure being securely mounted to said pilot support shell, a reinforcing means for reinforcing the connection between said main longitudinal support structure and said pilot support shell, said main longitudinal support structure, said pilot support shell, and said reinforcing means forming the fuselage primary structure of said lightweight aircraft, a wing structure attached to said fuselage primary structure, a tail structure attached to said fuselage primary structure behind said wing structure, a propelling means attached to said fuselage primary structure, a landing gear assembly to said fuselage primary structure, and a landing gear fitting connected to said landing gear assembly and directly attached to said reinforcing means.

31. A lightweight aircraft comprising:

a main longitudinal support structure having a forward end, a pilot support shell constructed of composite material formed to support the seat, legs, and back of a pilot seated in it, said main longitudinal support structure being securely mounted to said pilot support shell, a reinforcing means for reinforcing the connection between said main longitudinal support structure and said pilot support shell, said main longitudinal support structure, said pilot support shell, and said reinforcing means forming the fuselage primary structure of said lightweight aircraft, a wing structure attached to said fuselage primary structure, a tail structure attached to said fuselage primary structure behind said wing structure, a propelling means attached to said fuselage primary structure, said propelling means including an engine mounted to said fuselage primary structure, and said engine being mounted directly to said reinforcing means.

32. A lightweight aircraft comprising:

a main longitudinal support structure having a forward end, a pilot support shell constructed of composite material formed to support the seat, legs, and back of a pilot seated in it, said main longitudinal support structure being securely mounted to said pilot support shell, a reinforcing means for reinforcing the connection between said main longitudinal support structure and said pilot support shell, said main longitudinal support structure, said pilot support shell, and said reinforcing means forming the fuselage primary structure of said lightweight aircraft, a wing structure attached to said fuselage primary structure, a tail structure attached to said fuselage primary structure behind said wing structure, a propelling means attached to said fuselage primary structure, and a wing boom fitting assembly connected to said wing structure and directly attached to said reinforcing means.

33. A lightweight aircraft comprising:

a main longitudinal support structure having a forward end, a pilot support shell constructed of composite material formed to support the seat, legs, and back of a pilot seated in it, said main longitudinal support structure being securely mounted to said pilot support shell, a reinforcing means for reinforcing the connection between said main longitudinal support structure and said pilot support shell, said main longitudinal support structure, said pilot support shell, and said reinforcing means forming the fuselage primary structure of said lightweight aircraft, a wing structure attached to said fuselage primary structure, a tail structure attached to said fuselage primary structure behind said wing structure, a propelling means attached to said fuselage primary structure, and said propelling means including a fuel tank directly mounted to said reinforcing means.

34. A lightweight aircraft comprising:

a main longitudinal support structure having a forward end, a pilot support shell constructed of composite material formed to support the seat, legs, and back of a pilot seated in it, said main longitudinal support structure being securely mounted to said pilot support shell, a reinforcing means for reinforcing the connection between said main longitudinal support structure and said pilot support shell, said main longitudinal support structure, said pilot support shell, and said reinforcing means forming the fuselage primary structure of said lightweight aircraft, a wing structure attached to said fuselage primary structure, a tail structure attached to said fuselage primary structure behind said wing structure, at least one secondary structure mounted to said fuselage primary structure to at least one attachment point, said reinforcing means being formed of said composite material in a single piece with said pilot support shell, and said composite material including embedded metal portions at said attachment point.

35. A pilot module for a lightweight aircraft having a fuselage primary structure that includes a longitudinally disposed support structure, a wing structure attached to said fuselage primary structure, and a tail structure attached aft of said wing structure to said fuselage primary structure comprising:

a pilot support shell constructed of composite material formed to support the seat, legs, and back of a pilot positioned on it and forming an integral part of said fuselage primary structure, at least one reinforcing member connected to said pilot support shell and said longitudinally-disposed support structure and also forming an integral part of said fuselage primary structure, said reinforcing member being formed of said composite material in a single piece with said pilot support shell, and an external fairing positioned behind and adjacent said pilot support shell and attached to said fuselage primary structure.

36. The pilot module of claim 35 including, a securing means attached to said pilot support shell for securing said longitudinally disposed support structure to said pilot support shell so that at least a portion of said pilot support shell is disposed forward of the forward end of said longitudinally-disposed support structure.

37. The pilot module of claim 36 including, a bar attached to and extending between said forward end and a forward portion of said pilot support shell and positioned in front of a pilot seated in said pilot support shell.

38. The pilot module of claim 35 including, a rudder pedal assembly directly attached to said pilot support shell, and a control stick assembly directly attached to said pilot support shell.

39. A pilot module for a lightweight aircraft having a fuselage primary structure that includes a longitudinally disposed support structure, a wing structure attached to said fuselage primary structure, and a tail structure attached aft of said wing structure to said fuselage primary structure comprising:

a pilot support shell constructed of composite material formed to support the seat, legs, and back of a pilot positioned on it and forming an integral part of said fuselage primary structure, said pilot support shell having a structural U-shape structural cross-section with a generally horizontal lower flange member, a first generally vertical web member having a lower end connected to said lower flange member and a first upper end, a second generally vertical web member spaced from said first generally vertical web member and having a lower end connected to said lower flange member and a second upper end, a first upper flange member connected to said first upper end, and a second upper flange member connected to said second upper end, said pilot support shell including a seat, a floor, a back support, and a pair of arm rest side rails, said seat stiffening and transferring loads directly to said first and second generally vertical members, said floor and said back support comprising said lower generally horizontal flange, and said pair of arm rest side rails comprising said first and second flange members.

40. The pilot module of claim 39 including, an external fairing positioned behind and adjacent said pilot support shell and attached to said fuselage primary structure, such that it has a negligible effect on the structural integrity of said support shell.

41. The pilot module of claim 39 including, a rudder pedal assembly directly attached to said pilot support shell, and a control stick assembly directly attached to said pilot support shell.

* * * * *